(12) United States Patent
McManigal

(10) Patent No.: US 8,745,915 B2
(45) Date of Patent: Jun. 10, 2014

(54) VARIABLE LIGHT FISHING LURE

(76) Inventor: Patrick McManigal, Wauwatosa, WI (US)

( * ) Notice: Subject to any disclaimer, the term of this patent is extended or adjusted under 35 U.S.C. 154(b) by 41 days.

(21) Appl. No.: 13/106,713

(22) Filed: May 12, 2011

(65) Prior Publication Data

US 2011/0277370 A1    Nov. 17, 2011

Related U.S. Application Data

(60) Provisional application No. 61/334,330, filed on May 13, 2010.

(51) Int. Cl.
*A01K 85/01* (2006.01)

(52) U.S. Cl.
CPC ..................... *A01K 85/01* (2013.01)
USPC ........................ 43/17.6; 43/42.09; 43/42.31

(58) Field of Classification Search
USPC ................ 43/17.6, 42.09, 42.31, 42.06
IPC ........................................... A01K 85/01
See application file for complete search history.

(56) References Cited

U.S. PATENT DOCUMENTS

| | | | | |
|---|---|---|---|---|
| 3,762,092 | A * | 10/1973 | Bercz et al. ..................... | 43/17.6 |
| 4,610,103 | A | 9/1986 | Steinman | |
| 4,744,169 | A * | 5/1988 | Nochta .......................... | 43/42.31 |
| 4,953,319 | A * | 9/1990 | Kasper et al. ................. | 43/42.06 |
| 5,490,344 | A | 2/1996 | Bussiere | |
| 5,566,494 | A * | 10/1996 | Zimmer ......................... | 43/17.6 |
| 5,737,867 | A * | 4/1998 | Tsutsumi et al. .............. | 43/17.6 |
| 6,021,595 | A | 2/2000 | Noel | |
| 6,029,388 | A | 2/2000 | Yokogawa et al. | |
| 6,209,254 | B1 | 4/2001 | Sylla et al. | |
| 6,435,688 | B1 * | 8/2002 | Pittman .......................... | 362/34 |
| 6,647,659 | B1 | 11/2003 | King et al. | |
| 6,679,614 | B2 * | 1/2004 | Pittman .......................... | 362/34 |
| 6,922,935 | B2 | 8/2005 | Yu | |
| 7,107,717 | B2 | 9/2006 | Pelegrin | |
| 7,131,233 | B1 | 11/2006 | Preston | |
| 7,263,797 | B1 | 9/2007 | Trillo | |
| 7,562,489 | B2 | 7/2009 | Turner | |
| 7,707,764 | B1 | 5/2010 | Osburn | |
| 7,716,868 | B2 * | 5/2010 | Emmott ....................... | 43/42.06 |
| 7,841,126 | B2 * | 11/2010 | Huppert ....................... | 43/43.14 |
| 8,402,688 | B2 * | 3/2013 | Choi ............................ | 43/42.31 |
| 8,567,109 | B1 * | 10/2013 | Grigorovich ................. | 43/17.6 |
| 2007/0011936 | A1 | 1/2007 | Marino | |
| 2008/0295384 | A1 * | 12/2008 | Emmott ...................... | 43/42.09 |
| 2008/0301996 | A1 | 12/2008 | Gemmell | |

* cited by examiner

*Primary Examiner* — Darren W Ark
*Assistant Examiner* — Kathleen Alker
(74) *Attorney, Agent, or Firm* — AbsoluteTechnology Law Group, LLC

(57) ABSTRACT

The present invention is a variable light fishing lure comprised of a plastic housing with an internal cavity for holding a submergible lighted element and an angled aperture for inserting the lighted element into the cavity. A plug is inserted into the angled aperture to prevent the lighted element from falling out of the housing. Water can be added to plastic housing before inserting the plug to adjust the buoyancy of the fishing lure. The outside of the plastic housing contains a striated pattern which allows light from the lighted element to shine through the housing. The lighted element can be easily removed from the housing and replaced with the same or another color lighted element.

12 Claims, 5 Drawing Sheets

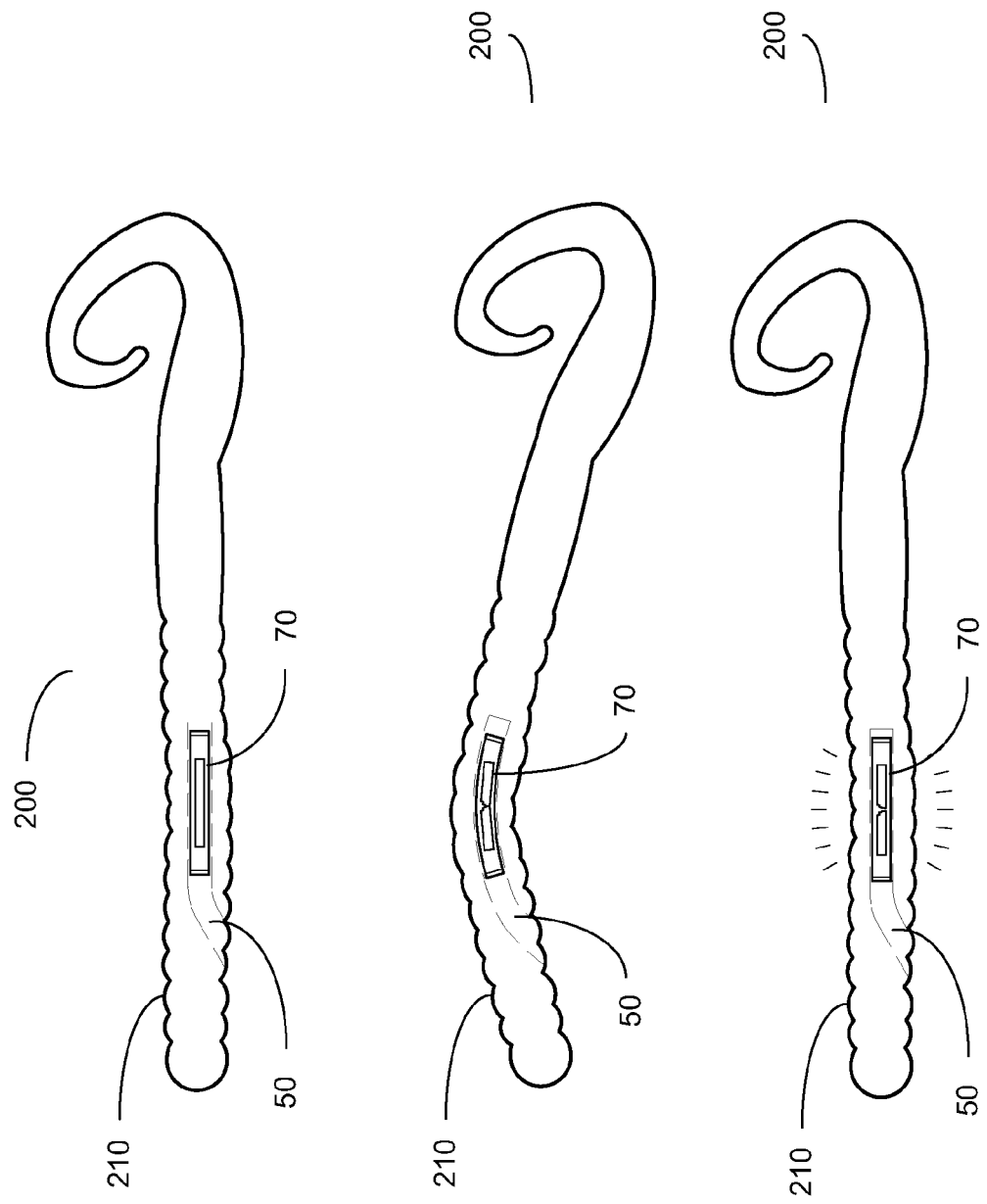

VARIABLE LIGHT FISHING LURE

CROSS-REFERENCE TO RELATED APPLICATIONS

This application claims priority to U.S. Provisional Application No. 61/334,330 filed on May 13, 2010.

FIELD OF INVENTION

The present invention relates to the field of fishing lures and more particularly to a variable light and buoyancy fishing lure.

BRIEF DESCRIPTION OF THE DRAWINGS

FIG. 5 illustrates a side view of an exemplary embodiment of a flexible variable light fishing lure.

TERMINOLOGY

Figure 1:
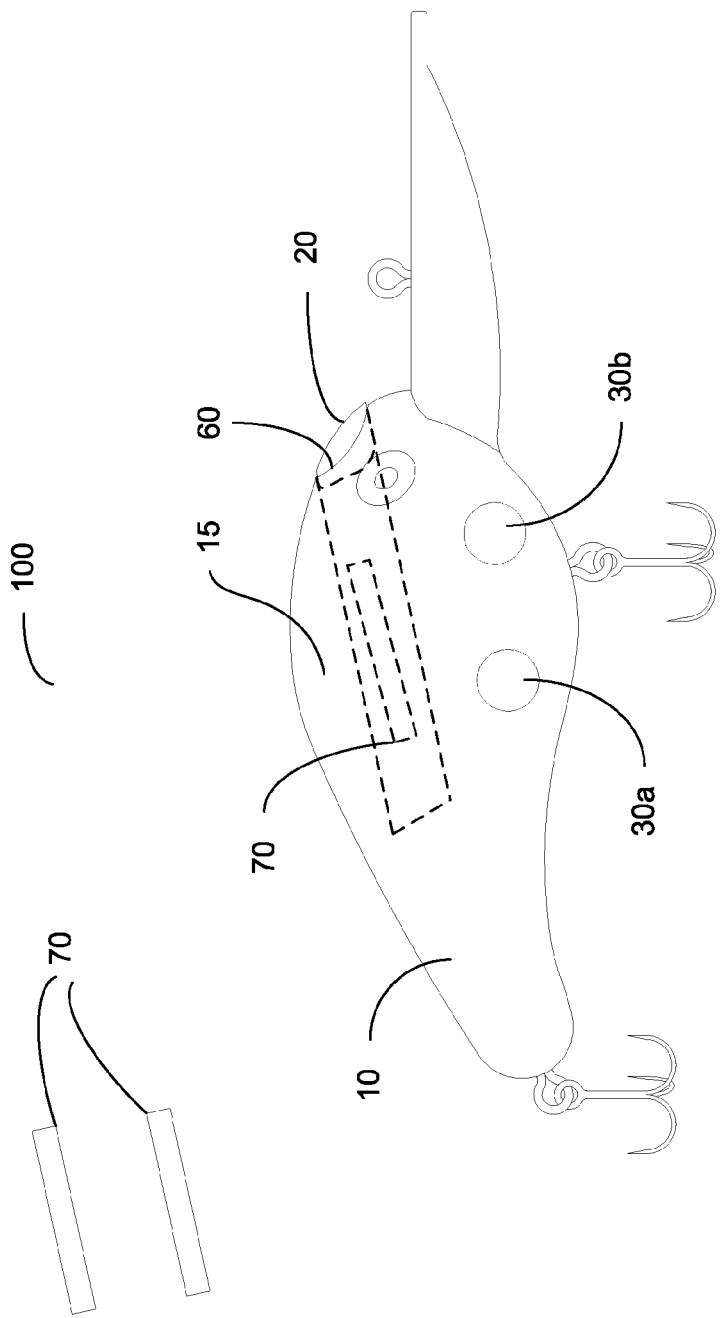
FIG. 1 illustrates a side view of an exemplary embodiment of a variable light and buoyancy fishing lure.

As used herein, the term "sound component" refers to a component inserted into the housing of a variable light and buoyancy fishing lure to create sound and vibration.

As used herein, the term "striation" refers to a linear marking on a housing which allows light to shine through.

As used herein, the term "submergible lighted element" refers to a light source which does not require an electrical power source, is waterproof, and is capable of withstanding pressure resulting from underwater use.

Background

The use of lures for fishing is well known in the art. Many normal lures lose their bright colors underwater and appear grey causing them to blend in with the darkened underwater conditions. Adding a light emitting or glowing element to a lure increases the contrast between the lure and it surroundings, allowing it to be more easily located, tracked, and attacked by predator fish than a non-light emitting or non-glowing lure.

Light travels differently through water than it does through air and certain colors of light travel farther through water than others. Higher wavelength colors, such as reds and oranges travel the least distance in water before appearing as shades of grey, followed by lower wavelength colors, such as greens, blues, and violet, which travels the greatest distance before appearing as a shade of grey.

Fishing lures can be made to glow a specific color by adding fluorescent additives to the lure during manufacturing or by coating the lure with a photo luminescent paint. Before these lures will glow, they must first be charged with a light source, such as sunlight or a flashlight when dark. Once charged, the lures can be lowered into the water where they will glow. The amount of time that the lures will glow before needing to be recharged varies with the type of paint or additive used.

These glowing lures are not desirable because of their need to be recharged. In addition, each lure glows only a single color, requiring the user to purchase multiple lures for various lighting or fishing conditions. For example, the user may want to have a lure that glows purple when visibility is extremely low, such as in muddy and/or deep water, and a lure that glows red, orange, or yellow when visibility is greater, such as in clear and/or shallow water.

Other lighted elements, such as glow sticks, are also used for fishing. Glow sticks are small enclosed plastic tubes that emit light. The light is caused by a chemical reaction; glow sticks contain two chemicals, diphenyl oxalate and hydrogen peroxide, and a suitable fluorescent dye (fluorophore). The hydrogen peroxide is located inside the glow stick while the diphenyl oxalate and the dye are confined to a capsule inside the glow stick. When the capsule is broken, the two chemicals mix and the resulting chemical reaction releases energy that excites the dye, which then relaxes by releasing a photon. The wavelength of the photon, that is, the color of the emitted light, depends on the structure of the dye. Glow sticks are waterproof and can tolerate high pressure conditions, such as those found underwater.

A fisherman may attach a glow stick to a float to increase the visibility of the component while night fishing. Glow sticks may also be clipped onto a fishing net or fishing line near bait to help lure fish into the net or to the bait.

Summary of the Invention

The present invention is a variable light fishing lure comprised of a plastic housing with an internal cavity for holding a submergible lighted element and an angled aperture for inserting the lighted element into the cavity. A plug is inserted into the angled aperture to prevent the lighted element from falling out of the housing. Water can be added to plastic housing before inserting the plug to adjust the buoyancy of the fishing lure. The outside of the plastic housing contains a striated pattern which allows light from the lighted element to shine through the housing. The lighted element can be easily removed from the housing and replaced with the same or another color lighted element.

The lure may further include additional components which move around inside of the housing creating sound and vibration to attract fish.

It is desirable to have a fishing lure which is capable of illumination in various colors with wavelengths adapted for various water, light, and climate conditions or for catching a particular kind of fish.

Detailed Description of Invention

For the purpose of promoting an understanding of the present invention, references are made in the text to exemplary embodiments of a variable light fishing lure, only some of which are described herein. It should be understood that no limitations on the scope of the invention are intended by describing these exemplary embodiments. One of ordinary skill in the art will readily appreciate that alternate but functionally equivalent materials, designs, and components may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates a side view of one embodiment of variable light and buoyancy fishing lure 100 comprised of housing 10 having internal cavity 15 and angled aperture 60, submergible lighted element 70, and plug 20.

In the embodiment shown, housing 10 is designed to resemble a fish and is hollow, resulting in a large internal cavity 15 (i.e., internal cavity 15 is comprised of the entire inside of housing 10). In various other embodiments, housing 10 may not be completely hollow or may have one or more chambers, segmented areas, or full or partial walls.

In the embodiment shown, aperture 60 is located at one end of housing 10 (i.e., the mouth end of the fish-shaped lure) and is angled to facilitate insertion and removal of plug 20 and submergible lighted element 70; however, in various other embodiments, the placement and/or shape of aperture 60 may vary. For example, for larger lures or other lure designs (e.g., an elongated lure) the aperture may be located on the back portion of the fish-shaped lure. In still other embodiments, variable light and buoyancy fishing lure 100 may include more than one aperture.

Before inserting submergible lighted element 70 through aperture 60 into internal cavity 15 of housing 10, submergible lighting element 70 is bent to break the internal capsule, activating the chemicals which produce the glowing light. After submergible lighted element 70 has been inserted into housing 10, plug 20 is placed into aperture 60, plugging aperture 60 so that submergible lighted element 70 is contained within internal cavity 15 of housing 10. Placing submergible lighted element 70 inside housing 10 (as opposed to mounting submergible lighted element 70 externally on housing 10) gives variable light and buoyancy fishing lure 100 the appearance of having a brighter and lighter "lateral line," which causes variable light and buoyancy fishing lure 100 to more closely resemble the fish's food source.

In the embodiment shown, submergible lighted element 70 rotates and moves throughout internal cavity 15. Plug 20 seals internal cavity 15, preventing submergible lighted element 70 from falling out of internal cavity 15. Housing 10 protects submergible lighted element 70 from damage and loss while variable light and buoyancy fishing lure 100 is under water.

To remove submergible lighted element 70, plug 20 is removed and housing 10 is tipped so that submergible lighted element 70 falls through aperture 60 and out of internal cavity 15 and housing 10. A new submergible lighted element 70 (e.g., a submergible lighted element of a different color) may then be inserted into housing 10 through aperture 60 and plug 20 replaced. The ability to easily remove the existing submergible lighted element and replace it with a new submergible lighted element allows the user to adapt variable light and buoyancy fishing lure 100 for different water conditions (e.g., clear, muddy, shallow, deep) and/or attract a particular kind of fish. For example, the user may want to use a submergible lighted element that glows purple when visibility is extremely low, and a submergible lighted element that glows red, orange, or yellow when visibility is greater.

In various embodiments, submergible lighted element 70 may emit light at a wavelength ranging from 380 to 780 depending on the fluorophore contained in submergible lighted element 70. For example, 9,10-Bis(phenylethynyl)anthracene (BPEA) emits yellow-green light with a maximum wavelength of 486 nm, rubrene emits orange-yellow light at a wavelength of 550 nm, violanthrone emits orange light at a wavelength of 630 nm, 16,17-(1,2-ethylenedioxy)violanthrone emits red light at a wavelength of 680 nm, and 16,17-dihexyloxyviolanthrone emits infrared light at a wavelength of 725 nm.

Plug 20 has a diameter slightly larger than aperture 60 and is shaped to match the shape and angle of aperture 60. In the embodiment shown, plug 20 is comprised of a soft liquid plastic and has a color similar to that of variable light and buoyancy fishing lure 100. In various embodiments, plug 20 may be scented (e.g., garlic-scented) to attract a particular type of fish.

The buoyancy of variable light and buoyancy fishing lure 100 may be adjusted by adding water to internal cavity 15 of housing 10 before inserting plug 20. The more water that is added, the less buoyant variable light and buoyancy fishing lure 100 becomes. Changing the buoyancy of variable light and buoyancy fishing lure 100 changes how the lure moves through the water and may be used to attract a particular type of fish by more closing mimicking the movement of the fish's food source.

In the embodiment shown, variable light and buoyancy fishing lure 100 further includes sound components 30a, 30b. Sound components 30a, 30b move throughout the interior of housing 10, creating sound and vibration which may serve as an additional attractant to attract fish to variable light and buoyancy fishing lure 100.

In the embodiment shown, sound components 30a, 30b are steel balls which are free to move throughout the entire internal cavity 15 of housing 10 and which are added into internal cavity 15 during manufacturing. In various other embodiments, variable light and buoyancy fishing lure 100 may contain more or fewer sound components 30 of various shapes, sizes, weights and materials, some or all of which may be confined to a specific chamber, sealed compartment, or portion of the variable light and buoyancy fishing lure 100 to limit movement of sound components 30.

In the embodiment shown, variable light and buoyancy fishing lure 100 has a length of approximately 4.5 inches and a width of approximately 1.25 inches at its widest point and submergible lighted element 70 has a diameter of 4 approximately millimeters and a length of approximately 1.5 inches. In various other embodiments, variable light and buoyancy fishing lure 100 may be smaller or larger and/or have varying shapes (e.g., variable light and buoyancy fishing lure 100 may be narrow and elongated to resemble a minnow). For example, a variable light and buoyancy fishing lure adapted for open water deep sea fishing may have a length of 12 inches or more. For larger lures, a larger submergible lighted element 70 will be used. For example, submergible lighted element 70 may have a diameter of approximately 6 millimeters and a length of approximately 8, 10, or 12 inches, depending on the size and shape of housing 10. In still other embodiments, more than one submergible lighted element 70 may be used.

In the embodiment shown, housing 10 is comprised of a clear hard plastic; however, in various other embodiments, housing 10 may be semi-flexible or flexible and/or be comprised of a material other than hard plastic, such as a soft plastic.

In various embodiments, the outside of housing 10 may be painted any color, color scheme, or pattern known in the art used to lure fish. In the embodiment shown, variable light and buoyancy fishing lure 100 further includes two hooks; however, in various other embodiments, variable light and buoyancy fishing lure 100 may contain any number of hooks or elements used to lure or hook fish.

In the embodiment shown, submergible lighted element 70 is a cylindrical glow stick known in the art; however, in other embodiments may be of another shape including, but not limited to square, rectangular, round, or oval.

Figure 2:
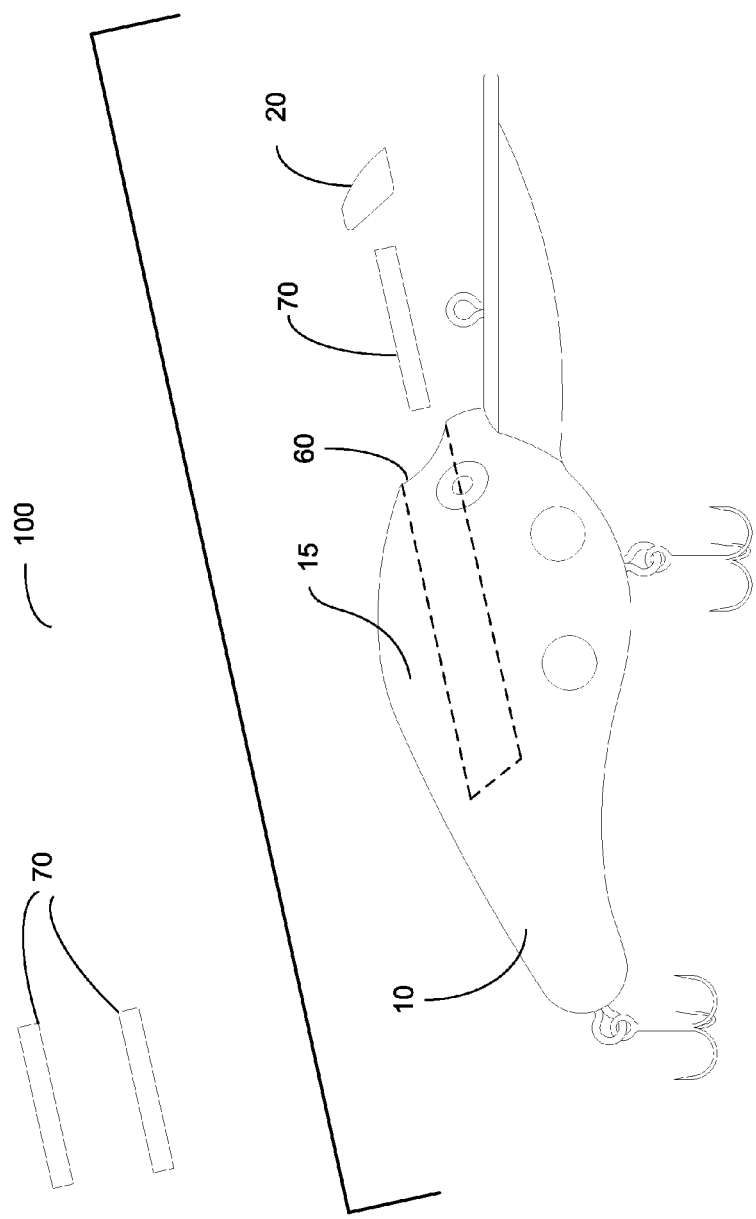
FIG. 2 illustrates an exploded view of an exemplary embodiment of a variable light and buoyancy fishing lure.

FIG. 2 illustrates an exploded view of one embodiment of variable light and buoyancy fishing lure 100.

Figure 3:
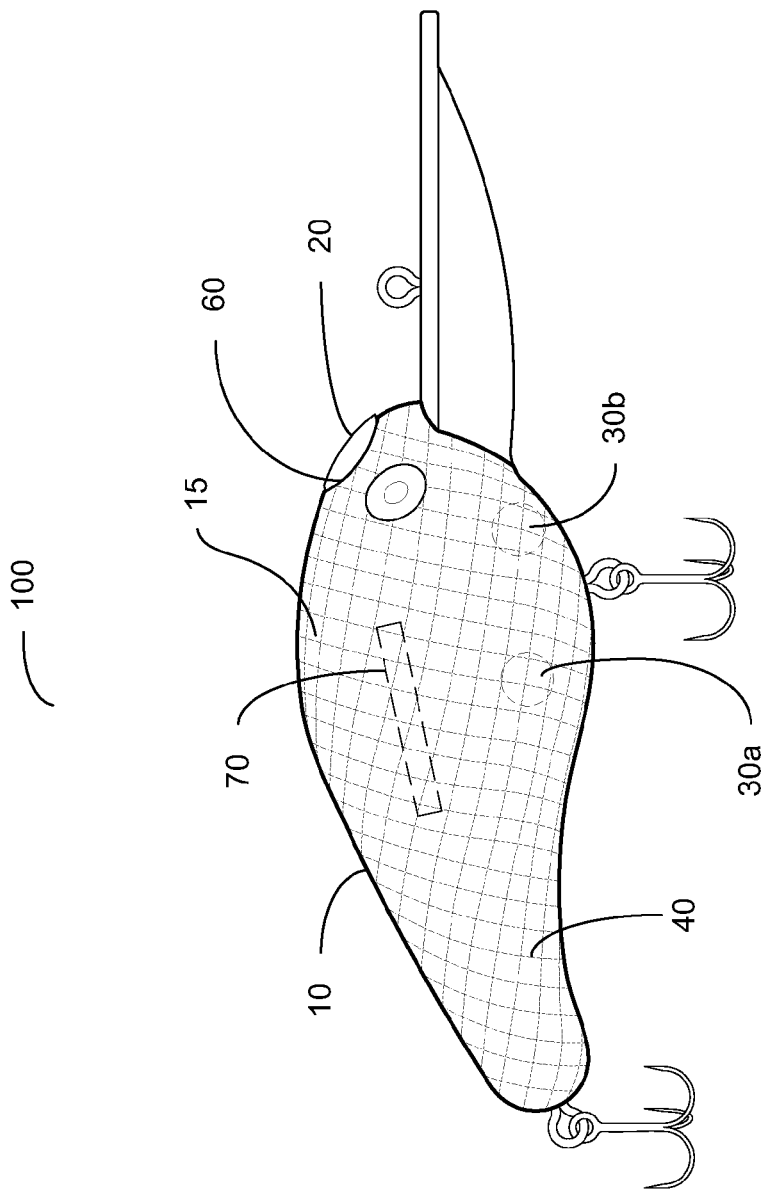
FIG. 3 illustrates a side view of an exemplary embodiment of a variable light and buoyancy fishing lure having transparent striations.

FIG. 3 illustrates a side view of one embodiment of variable light and buoyancy fishing lure 100 having a plurality of transparent striations 40. Transparent striations 40 allow the glow from submergible lighted element 70 to be visible through a colored housing 10.

Figure 4:
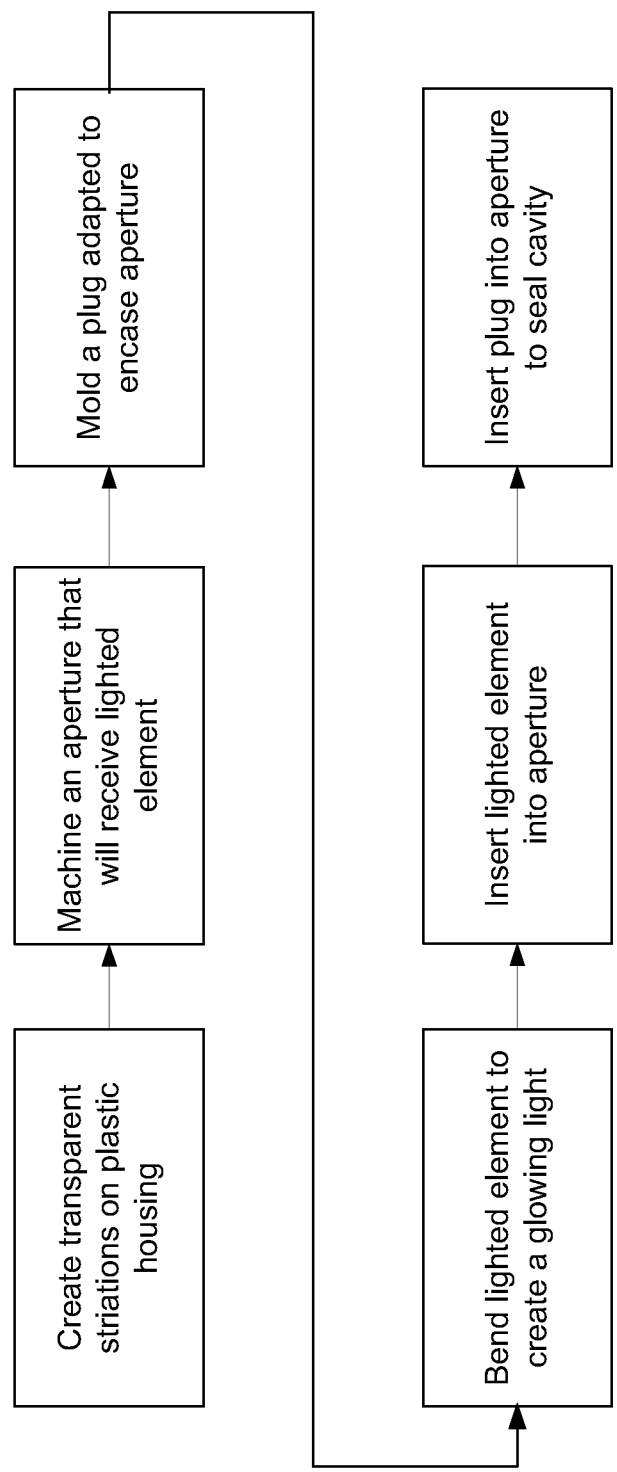
FIG. 4 illustrates an exemplary method of making a variable light and buoyancy fishing lure having transparent striations.

FIG. 4 illustrates an exemplary method of making variable light and buoyancy fishing lure 100 having transparent striations 40. First, transparent striations 40 are created on housing 10. Transparent striations 40 may be created before or after housing 10 is painted in the desired color scheme (e.g., striations may be created during the manufacturing process or added after manufacturing). In one embodiment, striated adhesive tape is used to cover the exterior surface of housing 10, which is then painted one or more colors. The striated pattern of the tape creates transparent striations 40 on housing 10.

Second, aperture 60 is machined so that submergible lighted element 70 may be inserted into housing 10. In the embodiment shown, the resulting aperture 60 is angled. Third, plug 20 is molded in dimensions necessary to seal aperture 60. Fourth, submergible lighted element 70 is bent to activate the chemical reaction which causes submergible lighted element 70 to glow. Submergible lighted element 70 is then inserted into housing 10 through aperture 60 and plug 20 is inserted into aperture 60 to seal housing 10.

In various other embodiments, one or more sound components 30 and/or water may added to housing 10 before inserting plug 20 into aperture 60. Adding one or more sound components 30 creates sound and vibration which may attract fish to variable light and buoyancy fishing lure 100. Changing the buoyancy of variable light and buoyancy fishing lure 100 changes how the lure moves through water. The ability to vary the sound, buoyancy, scent of plug 20, and color of submergible lighted element 70 allows the user to modify variable light and buoyancy fishing lure 100 to attract a particular kind of fish or to suit the specific water conditions in which the user is fishing using a single lure. In addition, the user may select a variable light and buoyancy fishing lure having a different housing size, shape, and/or color scheme better suited to attract the desired type of fish.

FIG. 5 illustrates a side view of variable light fishing lure 200. Variable light fishing lure 200 has cavity 50 for inserting lighted element 70 into flexible housing 210. Flexible housing 210 is comprised of a flexible plastic, but in other embodiments may be comprised of rubber or another flexible material.

FIG. 5 further illustrates that the user can activate submergible lighted element 70 after it has been placed inside cavity 50 by bending variable light fishing lure 200.

In the embodiment shown, variable light fishing lure 200 resembles a worm; however, in various other embodiments, variable light fishing lure 200 may resemble a minnow, crawfish, or other object.

What is claimed is:

1. A modular variable light and buoyancy fishing lure system with interchangeable light emitting components comprised of:
   at least one clear housing having a layer of applied color and a plurality of substantially transparent striations to emit light, wherein said housing has at least one convex upper curve and at least one combined convex and concave lower curve;
   an internal cavity formed by said at least one clear housing, said internal cavity adapted to encase one of a plurality of interchangeable submergible lighted elements;
   at least one angled aperture in said at least one clear housing for inserting one of said plurality of interchangeable submergible lighted elements into said internal cavity, wherein said at least one angled aperture is angled obliquely to a longitudinal axis of said at least one clear housing;
   at least one deformable plug, said at least one deformable plug having dimensions larger than those of said at least one angled aperture when undeformed, wherein a first portion of said at least one deformable plug is shaped to match a shape and an oblique angle of said at least one angled aperture, wherein a second portion of said at least one deformable plug is shaped to match said convex upper curve of said housing, wherein said at least one deformable plug is a single, unitary piece; and
   said plurality of interchangeable submergible lighted elements, wherein one of said plurality of interchangeable submergible lighted elements is inserted into said internal cavity via said at least one angled aperture, each of said plurality of interchangeable submergible lighted elements emits light having a wavelength ranging from 380 nm to 780 nm;
   wherein each of said plurality of interchangeable submergible lighted elements has dimensions which are less than the dimensions of said internal cavity allowing each of said plurality of interchangeable submergible lighted elements to rotate inside said internal cavity.

2. The system of claim 1 wherein each of said interchangeable submergible lighted elements emits light having a wavelength selected from the group consisting of 486 nm, 550 nm, 630 nm, 680 nm, and 725 nm.

3. The system of claim 1 wherein each of said plurality of interchangeable submergible lighted elements is cylindrical.

4. The system of claim 1 wherein each of said plurality of interchangeable submergible lighted elements has a diameter of 4 millimeters and a length of 1.5 inches.

5. The system of claim 1 wherein each of said plurality of interchangeable submergible lighted elements has a diameter of 6 millimeters and a length ranging from 8 inches to 12 inches.

6. The system of claim 1 wherein said at least one deformable plug is comprised of a soft liquid plastic.

7. The system of claim 1 wherein said at least one deformable plug is scented.

8. The system of claim 1 wherein said at least one clear housing is comprised of a substantially rigid plastic.

9. The system of claim 1 wherein said at least one clear housing is comprised of flexible plastic.

10. The system of claim 1 which further includes at least one steel ball sound component.

11. The system of claim 10 wherein said at least one steel ball sound component is confined to a sealed compartment within said at least one clear housing.

12. The system of claim 1 wherein said internal cavity further includes water.

* * * * *